United States Patent [19]
Nakata et al.

[11] Patent Number: 5,627,742
[45] Date of Patent: May 6, 1997

[54] THREE LEVEL POWER CONVERTING APPARATUS HAVING MEANS FOR BALANCING DC COMPONENT THEREOF

[75] Inventors: Kiyoshi Nakata, Iwase-machi; Mutsuhiro Terunuma, Mito; Tokunosuke Tanamachi; Kiyoshi Nakamura, both of Katsuta, all of Japan

[73] Assignee: Hitachi, Ltd., Tokyo, Japan

[21] Appl. No.: 297,569

[22] Filed: Sep. 1, 1994

[30] Foreign Application Priority Data

Sep. 1, 1993 [JP] Japan .................................. 5-217185

[51] Int. Cl.$^6$ .......................... G05F 1/10; H02M 1/12
[52] U.S. Cl. ...................... 363/98; 363/41; 323/235
[58] Field of Search ........................ 323/235, 319; 363/41, 98

[56] References Cited

U.S. PATENT DOCUMENTS

| | | | |
|---|---|---|---|
| 5,060,129 | 10/1991 | Maruyama | 363/41 |
| 5,155,675 | 10/1992 | Maruyama et al. | 363/98 |
| 5,250,890 | 10/1993 | Tanamachi et al. | 318/811 |
| 5,291,384 | 3/1994 | Mammano et al. | 363/17 |
| 5,321,599 | 6/1994 | Tanamachi et al. | 363/41 |
| 5,361,196 | 11/1994 | Tanamachi et al. | 363/41 |
| 5,375,050 | 12/1994 | Nakata et al. | 363/41 |
| 5,436,819 | 7/1995 | Mikami et al. | 363/41 |

FOREIGN PATENT DOCUMENTS

| | | |
|---|---|---|
| 0451440A2 | 10/1991 | European Pat. Off. . |
| 0579240A1 | 7/1993 | European Pat. Off. . |

OTHER PUBLICATIONS

"A Novel Approach to the Generation and Optimization of Three–Level PWM Waveforms", PESC '88 Record, Apr. 1988, pp. 1255–1262.

"Balance Control of DC Input Capacitors of NPC Inverter", Semiconductor Powe Study Group, Association of Electric Engineers, SPC–91–37, Jun., 1991, pp. 111–120.

Primary Examiner—Peter S. Wong
Assistant Examiner—Bao Q. Vu
Attorney, Agent, or Firm—Antonelli, Terry, Stout & Kraus, LLP

[57] ABSTRACT

In order to equalize voltage shares of DC-side voltage dividing capacitors of a three-level power converting apparatus for converting a DC voltage to a three-level AC phase voltage, there is provided an arrangement for compensating for rising and falling instances of a three-level AC voltage pulse depending on a difference voltage between the two voltage dividing capacitors and the polarity of the AC current, thereby adjusting a zero-voltage period of the AC voltage.

10 Claims, 10 Drawing Sheets

FOR SIGN(iu) × ⍋vc > 0

FIG. 4(b)

FOR SIGN(iu) × ⍋vc < 0

FIG. 5(a)

FOR SIGN(iu) × Δvc > 0

FIG. 5(b)

FOR SIGN(iu) × Δvc < 0

FIG. 6

FIG. 7(a) IN DRIVING

FIG. 7(b) IN POWER FACTOR OF ⓐ = 0

FIG. 7(c) IN REGENERATION

FIG. 9

FIG. 10(a) DIPOLAR MODULATION
FIG. 10(b) UNIPOLAR MODULATION
FIG. 10(c) OVERMODULATION

THREE LEVEL POWER CONVERTING APPARATUS HAVING MEANS FOR BALANCING DC COMPONENT THEREOF

BACKGROUND OF THE INVENTION

The present invention relates to a power converting apparatus for converting dc power to AC power, or inverting AC power to dc power, and more particularly concerns controlling a voltage across a capacitor on a DC side of the power converting apparatus to control an AC voltage of three levels.

A usual three-level power converter operates in such a way that capacitors connected in series divides a DC voltage into two DC voltages to create three voltage levels, including high, intermediate, and low potentials, and switching devices of a main circuit are turned on or off to selectively supply the three voltage levels to an AC side of the power converter.

A method of controlling an AC output voltage in which a power converter is used as an inverter for converting DC to AC was proposed in "A Novel Approach to the Generation and Optimization of Three-Level PWM Waveforms," PESC '88 Record, April, 1988, pp. 1255–1262 (hereinafter referred to as document 1).

The document 1 proposes a dipolar modulation method in which positive and negative pulse voltages are alternately fed out via a zero voltage as a modulation method useful for waveform improvement and minute voltage control of the three-level inverter.

However, the three-level power converter exhibits a problem in that voltages of the capacitors for dividing the DC voltage into two levels (hereinafter referred to as the voltage dividing capacitors) are subject to becoming unbalanced.

The imbalance is due to unequal voltage sharing of the voltage dividing capacitors. The unequal voltage sharing is caused by a DC current component flowing into a serial connection (hereinafter referred to as the neutral point) of the voltage dividing capacitors. Such an undesirable flowing of the current component results from a difference in the capacitances of the voltage dividing capacitors, a dispersion of the AC voltages of the power converter (imbalance of the positive and negative pulses), or a distortion of the output current (imbalance of positive and negative current waveforms likely caused by superimposition of higher harmonics).

A technique for limiting the voltage imbalance of the voltage dividing capacitors was disclosed in Japanese Patent Laid-Open No. 2-101969 (1995), "Balance Control of DC Input Capacitors of NPC Inverter," Semiconductor Power Study Group, Association of Electric Engineers, SPC-91-37, June, 1991, pp. 111–120 (hereinafter referred to as document 2).

SUMMARY OF THE INVENTION

The limiting technique for the voltage imbalance of the two DC components, as disclosed in the Japanese Patent Laid-Open No. 2-101969 (1995) is that in the dipolar modulation method of the document 1, amplitudes of the two sine modulated waves are changed to limit the voltage imbalance.

Also, the limiting technique for the voltage imbalance of the two DC components, as disclosed in the document 2, is that in the dipoler modulation method of the document 1, as in the Japanese Patent Laid-Open No. 2-101969 (1995), a signal corresponding to the DC component of the difference voltage of the two DC voltages is superimposed on an inverter voltage command depending on the drive or regeneration state.

However, the usual techniques mentioned above have the disadvantage that they cannot in actual practice limit the voltage imbalance or have too little capability to limit the imbalance irrespective of the limiting control of the difference voltage.

In an effort to solve the foregoing problems of the prior art, it is an object of the present invention to make equal voltage shares of DC-side voltage dividing capacitors of a DC-side three-level power converter.

Briefly, the foregoing object is accomplished in accordance with aspects of the present invention by a power converting apparatus having capacitors connected in series for dividing a DC voltage wherein, the DC voltage is supplied from the capacitors before being converted to an AC phase voltage having three potentials, including positive, zero, and negative potentials, comprising zero-voltage adjusting means for adjusting a zero-voltage duration on the basis of the output current polarity of the power converting apparatus and the between the voltage of the supply capacitors connected in series.

The inventors investigated in detail for causes of why the usual techniques proposed in the prior art could not limit the voltage imbalance or had too little capability to limit the voltage imbalance irrespective of the limiting control imposed of the difference voltage. They found that the control effect was low in a zone of low load power factor. As the above-mentioned usual techniques provide a limiting control depending on the output voltage of the power converter, there is a region in which actual control undesirably enlarges the difference voltage irrespective of application of control in the limiting direction.

The result is that the phase of the output current of the power converter does not coincide with that of the output voltage, even if the load is resistive or the power factor cannot be 1. For this reason, there is a period in which a compensation current is made to flow in a reverse direction contrary to that in which the compensation current must be originally injected into the neutral point. Thus, the control effect cannot be obtained by the difference from the normal direction. In particular, no control effect can be obtained at all if the power factor is 0.

The present invention detects the polarity of the output current of the power converting apparatus equivalent to the neutral point current to determine the polarity of the compensation current so that control can be effected in the direction of always reducing the difference voltage.

DETAILED DESCRIPTION OF THE PREFERRED EMBODIMENTS

The following describes the basic operation of main circuits and principles of operation of a neutral point voltage control system for a power converting apparatus used in an inverter for driving an electric vehicle, forming an embodiment of the present invention, by reference to the accompanying drawings.

Figure 1:
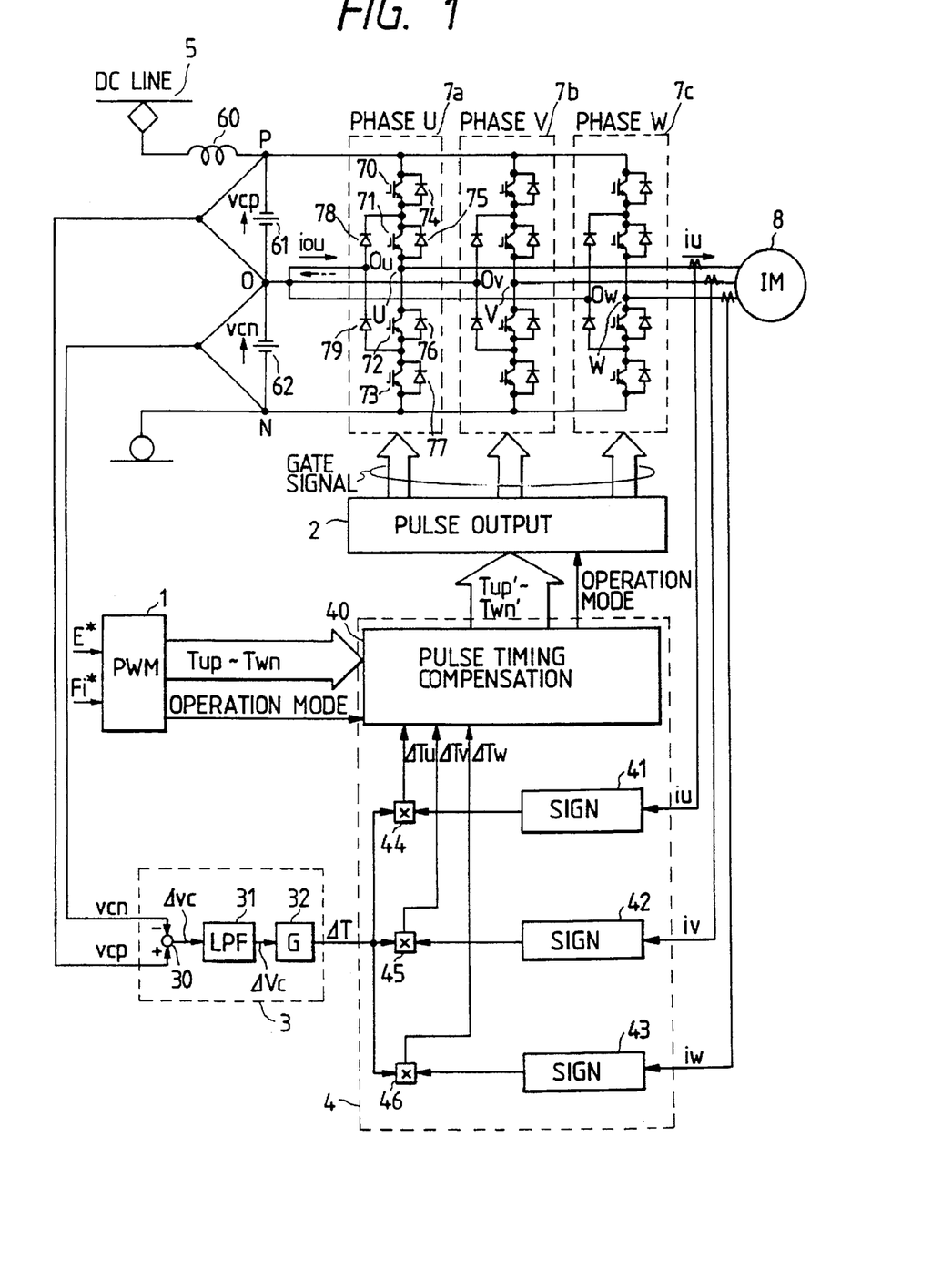
FIG. 1 is a schematic diagram illustrating a first embodiment of the present invention.

FIG. 1 depicts a schematic diagram illustrating the basic circuit for generating voltages of three phases. In the figure are indicated a DC voltage source 5 (electric vehicle power line), a DC reactor 60, and voltage dividing capacitors 61 and 62 connected in series to form neutral point O across the voltage of the DC voltage source 5. In the figure also are indicated switching units 7a, 7b, and 7c which comprise self-quenchable switching devices. Each of the switching units can selectively feed out a voltage at a high-potential point (point P voltage), a voltage at a neutral point (point O voltage), or a voltage at a low-potential point (point N voltage) depending on a gate signal applied to the switching device. The switching unit 7a, for example, has the self-quenchable switching devices 70 to 73 (which are IGBTs here or alternatively may be GTOes or transistors), reflux rectifying devices 74 to 77, and auxiliary rectifying devices 78 and 79. The load used in the embodiment is an induction motor 8. The switching units 7b and 7c have in the same construction as the switching unit 7a.

As an example, the switching unit 7a for phase U will be taken to describe the basic operation of the switching units by reference to Table 1 below. It should be noted that a reference potential is at the neutral point O and an output voltage of the switching unit 7a is an output phase voltage of the inverter, unless otherwise specified.

TABLE 1

| Output state | | Output mode | | |
| --- | --- | --- | --- | --- |
| | | Mode P<br>Voltage output at<br>high-potential point | Mode O<br>Voltage at<br>neutral point | Mode N<br>voltage at low-<br>potential point |
| Conduction<br>state | 70 | ON | OFF | OFF |
| | 71 | ON | ON | OFF |
| | 72 | OFF | ON | ON |
| | 73 | OFF | OFF | ON |
| Output<br>voltage eu | | $V_{cp}$ | O | $-V_{cn}$ |
| Equivalent<br>circuit for<br>single phase | | | | |

The switching devices 70 to 73 forming the switching unit 7a, as shown in Table 1, are turned on or off according to three kinds of conduction patterns. That is, in the output mode P in which the point P potential on the DC side is fed out, the switching devices 70 and 71 are on and switching devices 72 and 73 are off, feeding out an output voltage of +Vcp. In the output mode O in which the neutral point potential is fed out, the switching devices 71 and 72 are on and the switching devices 70 and 73 are off, feeding out an output voltage of zero. In the output mode N in which the point N potential is fed out, the switching devices 70 and 71 are off and the switching devices 72 and 73 are on, feeding out the output voltage of −Vcn. If the dividing capacitor voltages are fully balanced, Vcp=Vcn.

The table has an equivalent circuit for the main circuit of the switching unit and voltage dividing capacitors for a single phase. The switching unit is equivalent to the three-way switch which controls a duration and the polarity of a voltage pulse to control the output voltage eu.

The main circuit of the three-level inverter is described in the Japanese Patent Laid-Open Nos. 51-47848 (1976) and 56-74086 (1981) in detail.

In turn, the following describes the principles of the neutral point voltage control.

Figure 2:
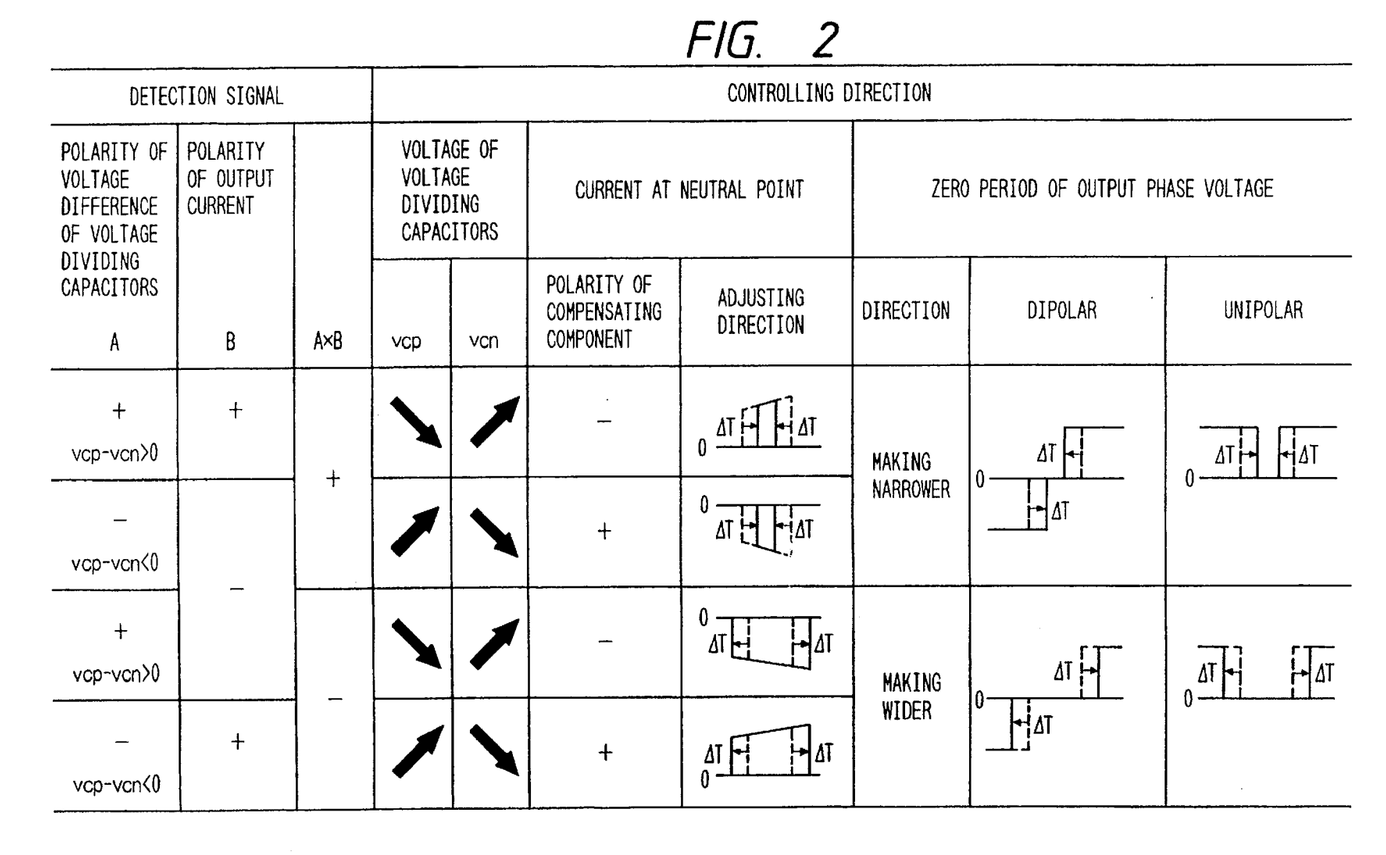
FIG. 2 is a table illustrating controlling directions of the neutral point voltage control.
Figure 3A:
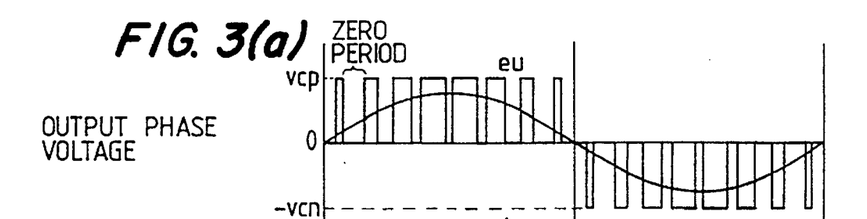
FIG. 3 is waveform diagram showing an example of operation waveforms for compensation of imbalance of the voltage capacitor voltages.
Figure 3B:
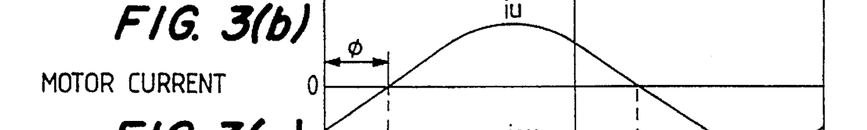
Figures 3C, 3D:
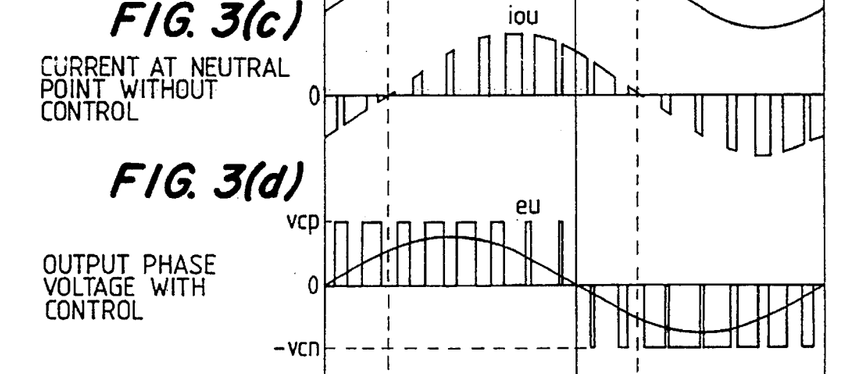
Figure 3E:
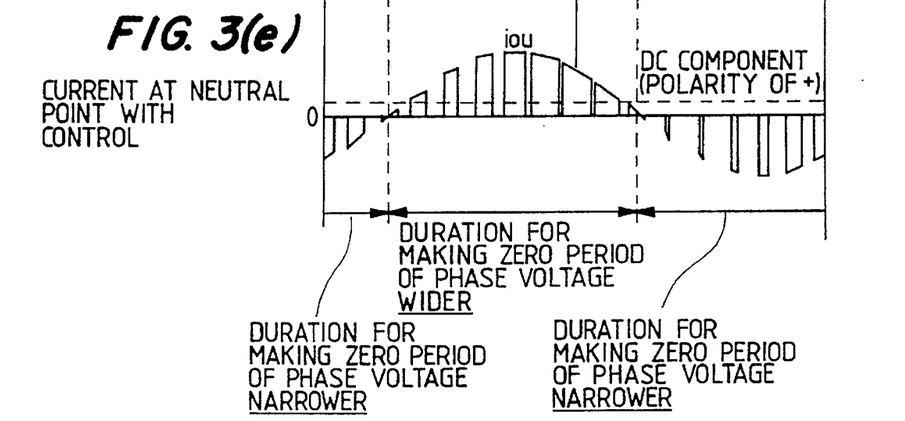

FIG. 2 depicts a controlling direction of the single phase only with respect to detected signals. The detected signals include a difference voltage ΔVc (=Vcp-Vcn) of the voltage dividing capacitors and one (iu here) of the output currents iu, iv, and iw. The polarity of the product of these signals determines the controlling direction. A controlled variable ΔT is adjusted depending on the difference voltage ΔVc of the voltage dividing capacitors.

The adjustment can be made in the four methods described below according as the polarity of the difference voltage of the voltage dividing capacitors and the polarity of the output current.

(1) The difference voltage of the voltage dividing capacitors is positive, or Vcp>Vcn.

(a) If the output current is positive, with the current iu indicated by an arrow in FIG. 1 assumed positive, the control should be made to decrease vcp and increase Vcn. Such a voltage imbalance can be improved by superimposing a new compensating current component on a neutral point current iou. It should be noted that even if the polarity of the compensating current component is identical, the adjusting direction of the duration of the neutral point current iou depends on the polarity of the output current. This means that the neutral point current iou should be superimposed on a negative compensating current component, which is a current component indicated by a broken arrow in FIG. 1, flowing into the neutral point.

Making the current flow into the neutral point represents to discharge of the voltage dividing capacitor 61 on the positive side and a charging of the voltage dividing capacitor 62 on the negative side. Therefore, the voltage imbalance of Vcp>Vcn can be dissolved.

In such a case, the output current iu flows in the arrow direction in FIG. 1 as the inverter is in operation. The neutral point current iou also flows with the same polarity and amount as the output current iu in the solid arrow direction in FIG. 1. The neutral point current iou cannot have the compensating current component superimposed thereon.

However, the voltage imbalance can be dissolved with respect to the fact that making the current flow into the neutral point is equivalent to making the currently flowing neutral point current iou decrease.

That is, the voltage imbalance in that case can be limited in such a way that the duration of the pulsating neutral point current iou is made narrower to decrease the neutral point current iou, or that the pulse duration is controlled to reduce the period of the neutral point current voltage output.

(b) If the output current is negative, the neutral point current iou is identical in polarity with the compensating current, since the neutral point current iou is flowing into the neutral point.

Therefore, the voltage imbalance can be limited by controlling the pulse duration so that the period of the neutral point voltage output can be increased.

(2) The difference voltage of the voltage dividing capacitors is negative, or Vcp<Vcn.

(a) If the output current is positive, control should be effected so that the voltage dividing capacitor 61 on the positive side can be charged and the voltage dividing capacitor 62 on the negative side can be discharged.

Therefore, the voltage imbalance can be limited by making the compensating current flow in a positive direction, or in the direction of the current flowing out of the neutral point.

In that case, also, the polarity of the output current iu (the neutral point current iou) is the same as that of the compensating current. Therefore, the voltage imbalance can be limited by controlling the pulse duration so that the period of the neutral point voltage output can be increased.

(b) If the output current is negative, the polarity of the neutral point current iou is opposite to that of the compensating current. Therefore, the compensating current should be equivalently increased by decreasing the neutral point current iou. That is, the voltage imbalance can be limited by controlling the pulse duration so that the period of the neutral point voltage output can be decreased.

The four methods described above can be summarized as follows.

With respect to the adjusting direction of the duration of the neutral point current, the adjusting direction of the duration is identical when the polarity of the product of the difference voltage of the voltage dividing capacitors by the output current is identical. Therefore, it is possible to adjust the neutral point current so that the voltage imbalance of the voltage dividing capacitors can be improved in such a way that the duration of the zero-voltage period should be made narrower if the polarity of the product of the difference voltage of the voltage dividing capacitors and the output current is positive or the duration of the zero-voltage period should be made wider if the polarity of the product of the difference voltage of the voltage dividing capacitors and the output current is negative.

Hereinafter, the control described above is referred to as the neutral point voltage control.

FIG. 3 depicts an example of operation waveforms for compensation in the event of Vcp<Vcn for the phase U only. FIGS. 3(a) to 3(c) show waveforms without the neutral point voltage control when the motor current (in FIG. 3(b)) coinciding with the output current is lagging by a power factor angle $\phi$. The neutral point current iou of the phase U flows only when the output phase voltage eu shown in FIG. 3(a) is zero. The waveform of the flowing neutral point current iou pulsates as shown in FIG. 3(c).

As the neutral point voltage control is used, the pulse duration of the output phase voltage is made narrower while the motor current, which is the load current, is positive. On the other hand, the pulse duration of the output phase voltage is made wider while the motor current, which is the load current is positive. The positive DC component is superimposed on the neutral point current.

The other phases are controlled in the same way. Such a control can balance Vcp with vcn. It should be noted that components other than the zero-phase component contained in the phase U neutral point current iou are canceled in the three phases so as not to affect the voltages of the voltage dividing capacitors.

The following describes the first embodiment of the present invention by reference to FIG. 1.

In the figure is shown a pulse duration modulating (PWM) means 1 which calculates output instances Tup and Tun of the output voltage pulse of the phase U in terms of an output voltage command E* and an output frequency command Fi* every time To prior to the feeding out of the voltage pulse. The PWM means 1 also calculates output instances Tvp and Tvn of the output voltage pulse of the phase V before feeding out the voltage pulse. The PWM means 1 further calculates output instances Twp and Twn of the output voltage pulse of the phase W before feeding out the voltage pulse. The operation mode output of the PWM means 1 is a datum of one bit to determine whether the output voltage pulse is a rising instance or falling instance.

On the other hand, a difference voltage detecting means 3 is shown in the figure. The difference voltage detecting means 3 obtains the difference voltage $\Delta Vc$ (=Vcp-Vcn) representing the difference between the voltages Vcp and Vcn of the voltage dividing capacitors with use of a subtracter 30 followed by detecting a low-frequency component $\Delta Vc$ through a low-pass filter 31 and multiplying it by a desired gain G through a gain control 32 to create a basic compensation duration $\Delta T$.

In the figure there is also shown polarity detector means 41 to 43 which operate to detect polarities of the currents iu, iv, and iw of the motor 8, which is the load for the inverter, respectively. Each of the polarity detector means 41 to 43 feeds out '+1' if the polarity is positive. It feeds out '−1' if the polarity is negative. The detectors then multiply their outputs by the basic compensation duration ΔT to create pulse timing compensation durations ΔTu, Δ Tv, and ΔTw for the respective phases. That is, the following equation is obtained.

$$Tx = Sign(ix) \cdot G \cdot \Delta Vc \qquad (1)$$

where x=u, v, and w, G>0, and Sign(ix)=1 (ix=>0) or=−1 (ix<0)

In the figure there is further shown a pulse timing compensating means 40 which compensates output instances of the output voltage pulses in terms of pulse timing compensation durations ΔTu, ΔTv, and ΔTw, output instances Tup, Tvp, and Twp of the output voltage pulses and operation mode information. The compensation is made as shown in FIGS. 4(a), 4(b) and 5(a), 5(b) before the voltage pulses are fed out to a pulse output means 2.

In an operation mode 1 for the phase U, $$Tup = Tup1' = Tup1 - \Delta Tu \quad Tun = Tun1' = Tun1 - \Delta Tu \qquad (2)$$

In an operation mode 2 for the phase U, $$Tup = Tup2' = Tup2 + \alpha Tu \quad Tun = Tun2' = Tun2 + \Delta Tu \qquad 3)$$

The following describes the output voltage of the three-level inverter for an electric vehicle with respect to the frequency and modulating methods, before demonstrating examples of the inverter.

Figure 9:
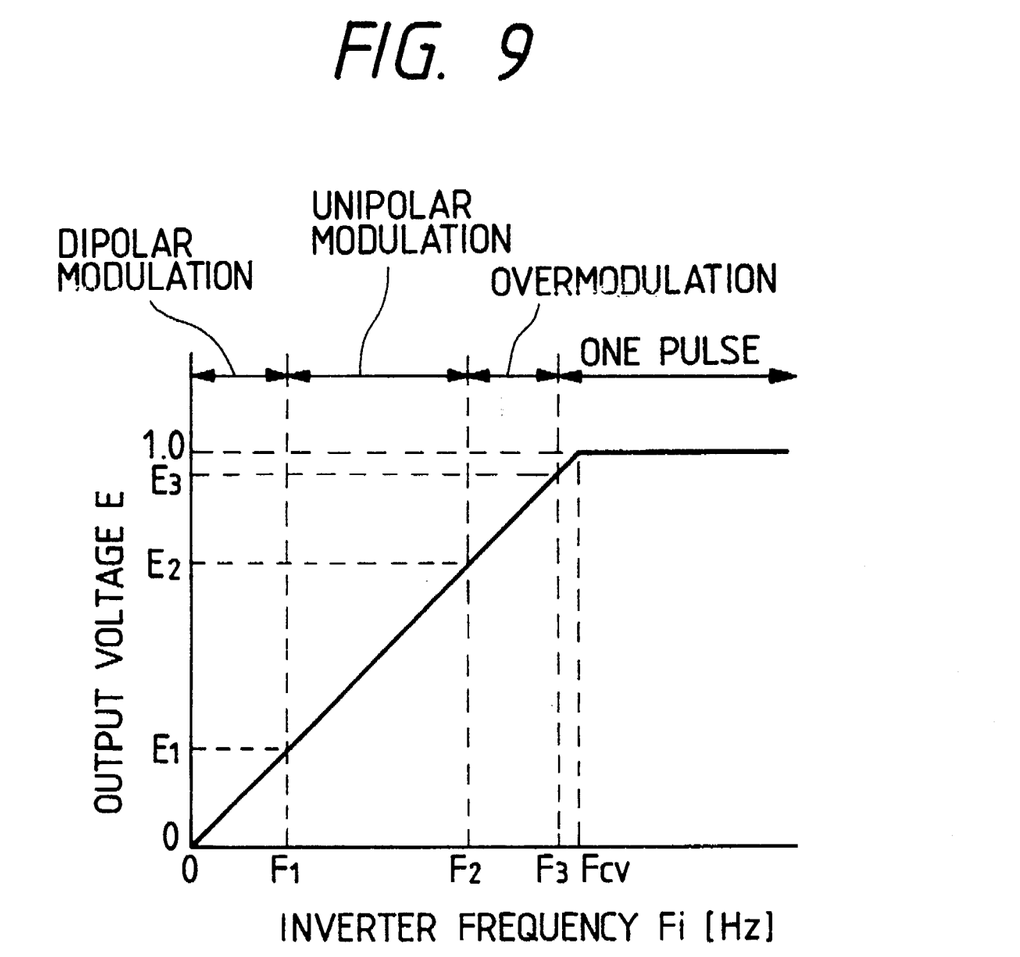
FIG. 9 is a graph illustrating the output voltage of the inverter with respect to the frequency.

FIG. 9 depicts a graph illustrating the output voltage of the inverter with respect to frequency.

The electric vehicle employs a control system that can make constant a ratio of the output voltage to the frequency as torque has to be controlled constant.

Figure 10A:
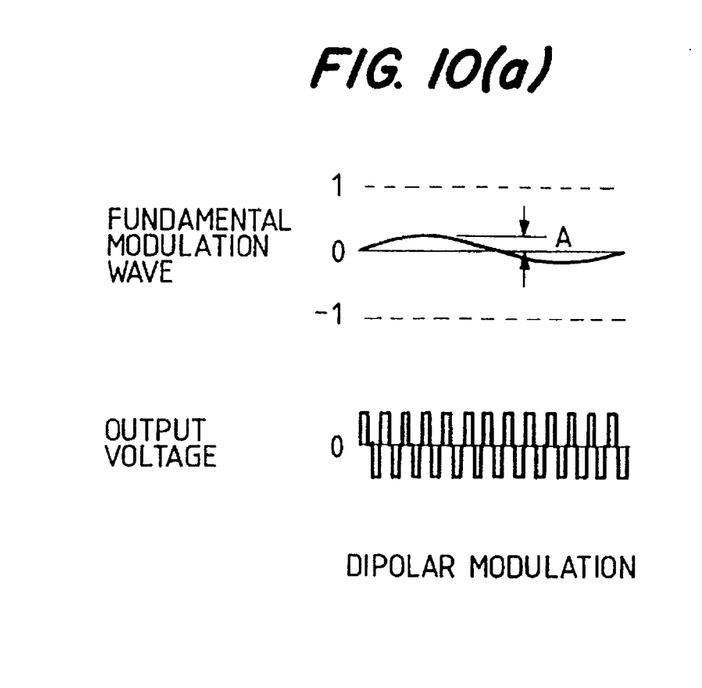
FIGS. 10(a), 10(b) and 10(c) are diagram illustrating modulation methods with respect to the basic modulating wave.
Figure 10B:
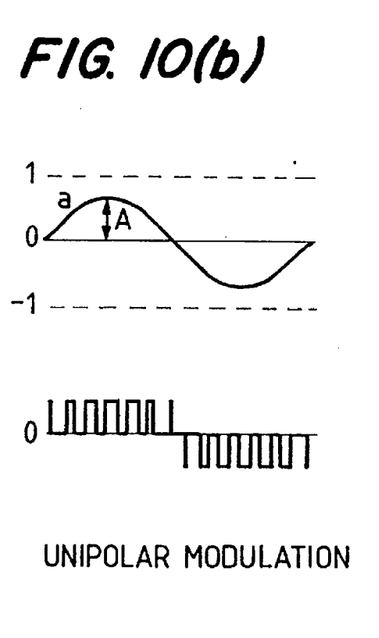
Figure 10C:
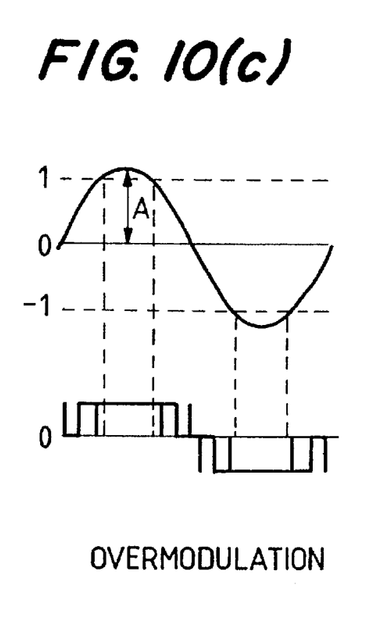

Therefore, it is desired that the inverter for an electric vehicle can continuously change its output voltage from zero to maximum. For this purpose, the modulation systems shown in FIG. 10 can be used.

The dipoler modulation shown in FIG. 10(a) can be used in a low-frequency (voltage) range as it can represent a very low voltage, including zero voltage.

The inverter output pulse (phase voltage) is featured in that the fundamental wave (fundamental modulating wave) can be represented in such a way that a pulse train of its half cycle is reciprocated positive and negative through the zero-voltage duration (neutral point voltage output duration).

A unipoler modulation shown in FIG. 10(b) can be used in an intermediate voltage range in such a way that a half cycle of the fundamental wave is represented by reciprocally feeding out the zero-voltage duration and pulses of the same polarity as the fundamental wave voltage.

An overmodulation shown in FIG. 10(c) can be used in a high voltage range in such a way that slits are removed from around the maximum amplitude of the fundamental wave of the unipolar modulation to feed out a higher voltage.

Shifting a single pulse from the overmodulation is effected by moving to a single pulse which can be pulse-duration controlled in a state having an excess output without feeding out the maximum voltage in the overmodulation, thereby smoothly controlling the voltage.

On the basis of the facts mentioned above, the following describes the examples of the first embodiment.

Figure 4A:
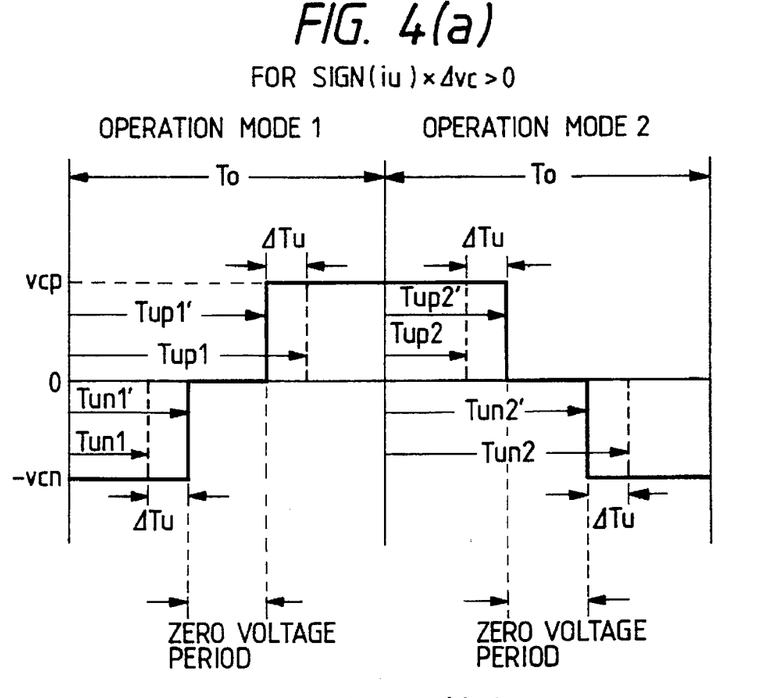
FIGS. 4(a), 4(b) are an example of the waveform of the phase voltage in the dipolar modulation.
Figure 4B:
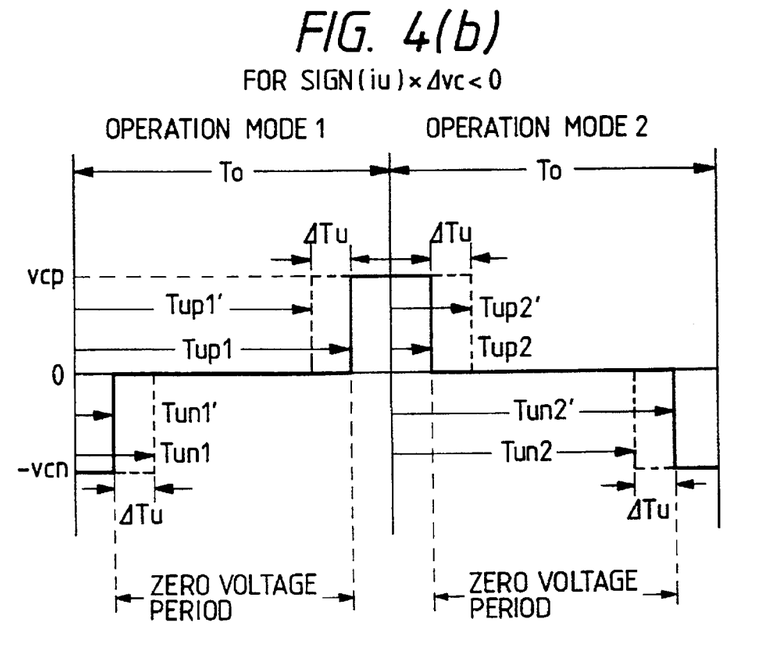

FIGS. 4(a), 4(b) depicts a waveform of a single cycle of the pulse of the output phase voltage with the first embodiment using dipolar modulation.

FIG. 4(a) depicts a waveform in case of sign(iu) x ΔVc>0. We can see that the zero-voltage period is decreased by the amount of ΔTu (4ΔTu). FIG. 4 (b) depicts a waveform opposite to that.

Figure 5A:
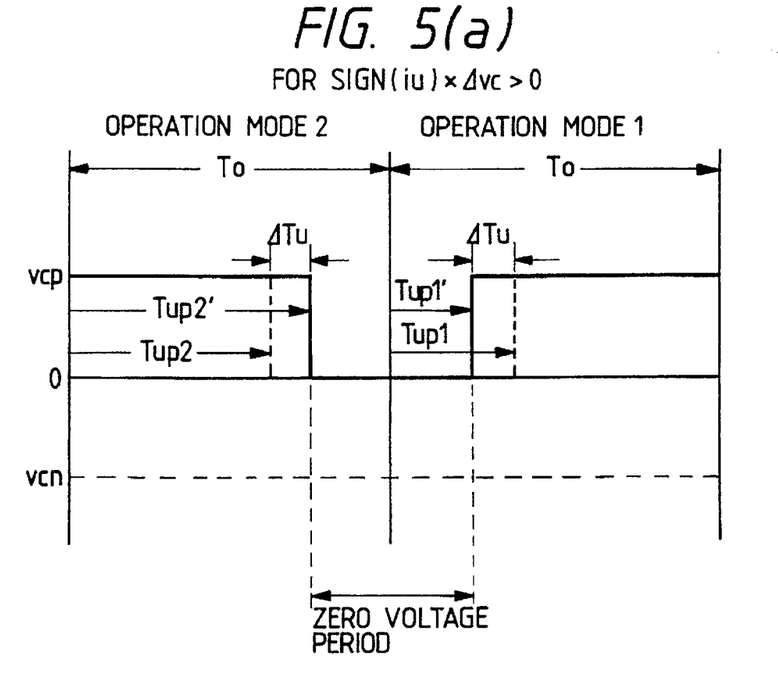
FIG. 5(a), 5(b) are waveform diagrams showing an example of the waveform of the phase voltage in unipolar modulation.
Figure 5B:
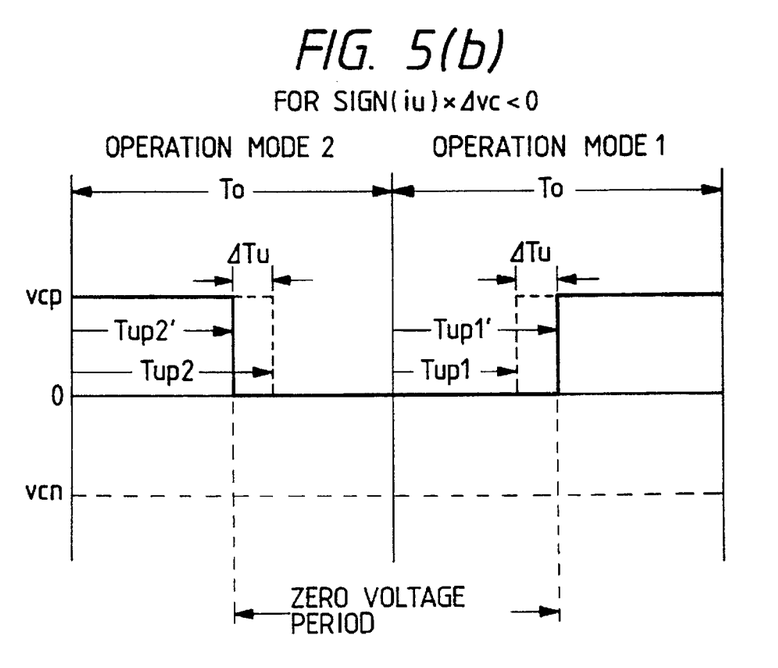

FIGS. 5(a), 5(b) depicts a waveform of one cycle of the pulse of the output phase voltage with the first embodiment using unipolar modulation.

FIG. 5(a) depicts a waveform in case of sign(iu) x ΔVc>0. The zero-voltage period is decreased. FIG. 5(b) depicts a waveform opposite to that.

Similarly, the single pulse which can be overmodulated and pulse-duration controlled can be controlled. Therefore, the first embodiment can be applied to an thee-level inverter for an electric vehicle so that the neutral point voltage control can be used for all the modulation systems independent of all operation frequency ranges. This is effective in that the software and hardware can be simplified.

Of course, the first embodiment can be used for a synchronous type (operation synchronization) in which the modulating wave is synchronized with a carrier, or even for an asynchronous type in which it is not synchronized, as long as any of the types can adjust the pulse duration only.

Now, the pulse output means 2 finally generates gate pulses depending on the output instances Tup' to Twn' to which the output phase voltage pulses are compensated before feeding them to the switching devices of the main circuit.

The first embodiment described above has the advantage that the voltage sharing of the DC-side voltage dividing capacitors of the three-level power inverter can be made equal independent of the PWM control method and the operation power factor (the AC current phase).

In principle, as described above, the voltage imbalance can be limited by executing pulse duration control depending on the polarity of the difference voltage of the voltage dividing capacitor and the polarity of the output current (neutral point current). However, such a method is not realistic as it is involved in a problem of detection delay as the current to discriminate the polarity is AC, which is too quick to detect it instantaneously. The problem will be made clear in a second embodiment of the present invention described below.

Figure 6:
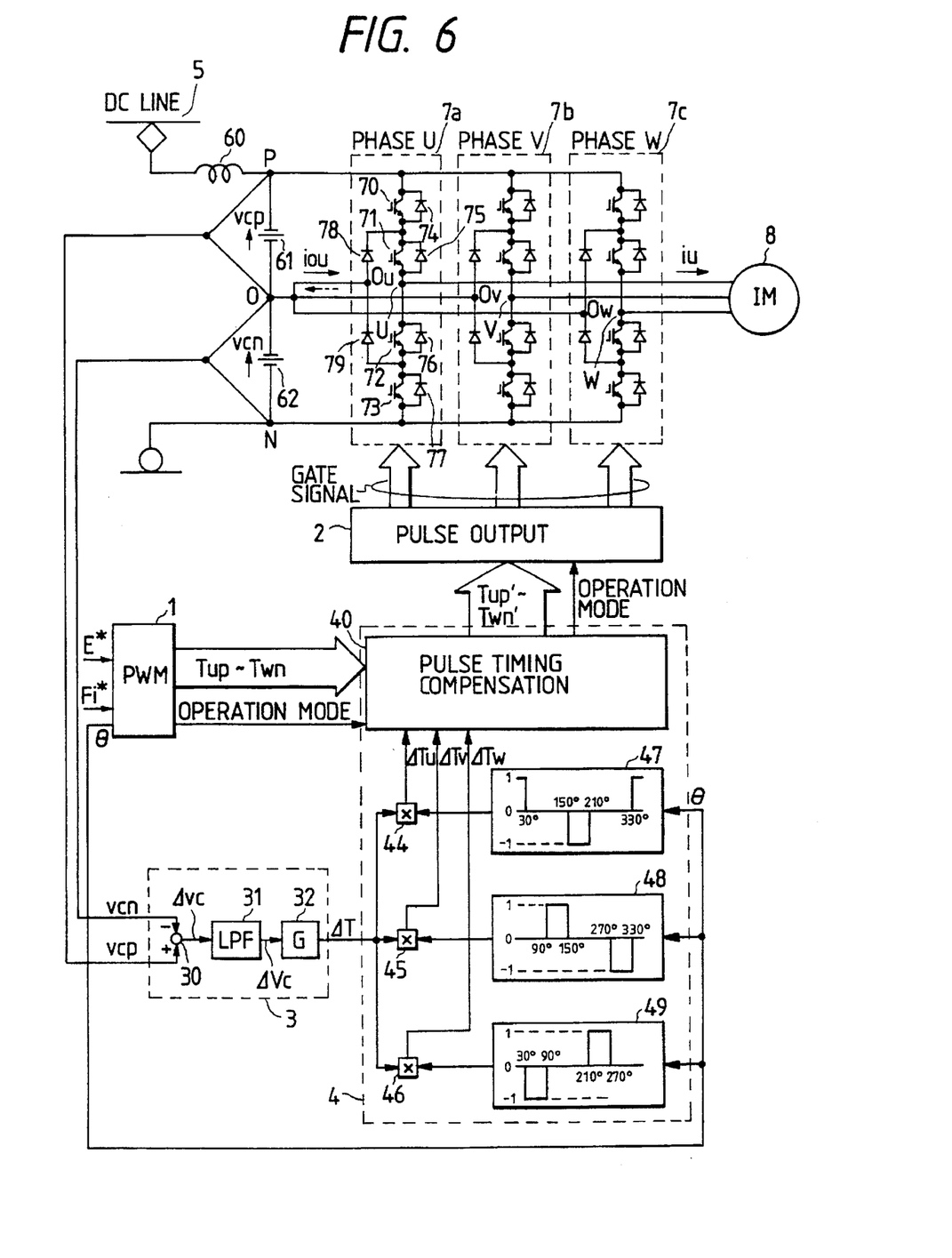
FIG. 6 is a schematic diagram illustrating a second embodiment of the present invention.

FIG. 6 depicts a schematic diagram illustrating the second embodiment of the present invention used in an inverter for driving an electric vehicle. Main circuits 5 to 8 in the figure are much the same as those of FIG. 1. The following describes operational principles of the second embodiment before explaining the construction of a control section which is different from that of FIG. 1.

The second embodiment has a control phase selector means for output current polarity discrimination in place of the discrimination means for detecting the output current to discriminate the polarity in the first embodiment in FIG. 1. The control phase selector means is featured in setting a phase range for discriminating the control polarity depending on the output phase voltage.

As a result, the second embodiment has the polarity detection of the output current.

Figures 7A, 7B, 7C:
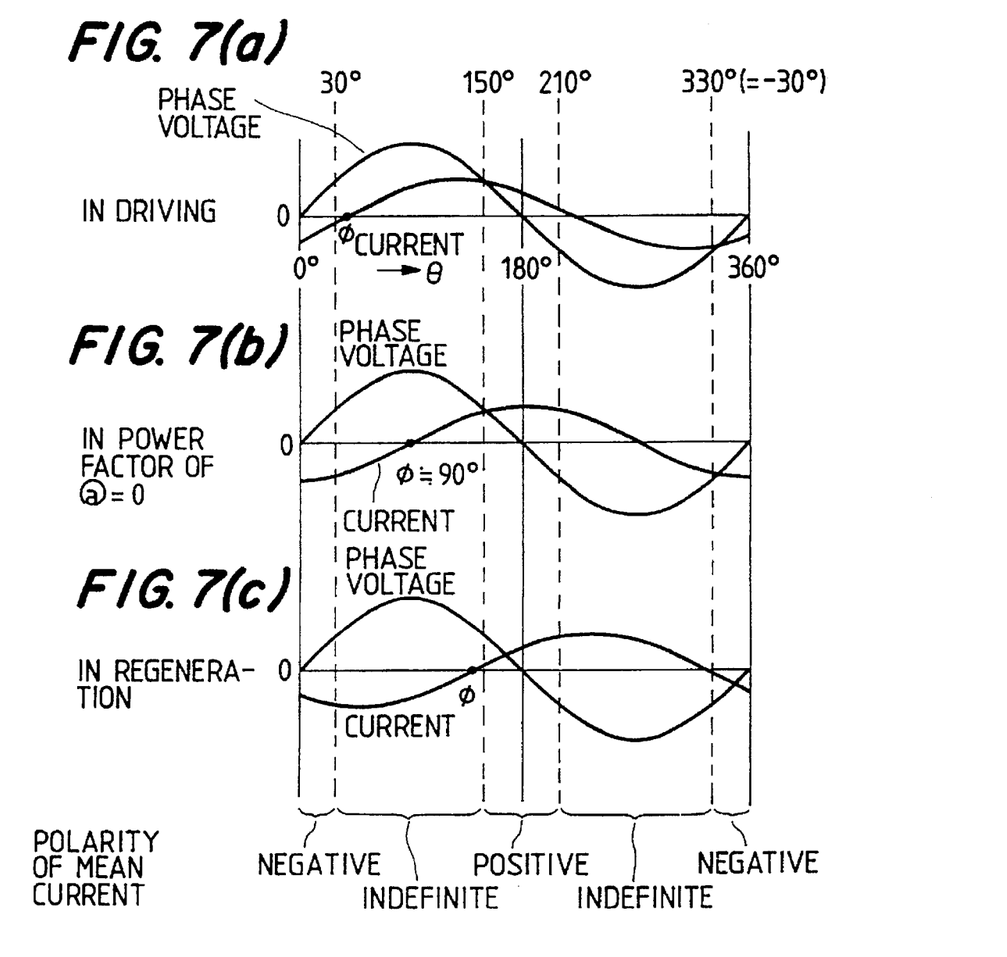
FIG. 7 is a diagram showing the relationships between the phase voltage and current in the second embodiment.
Figure 8A:
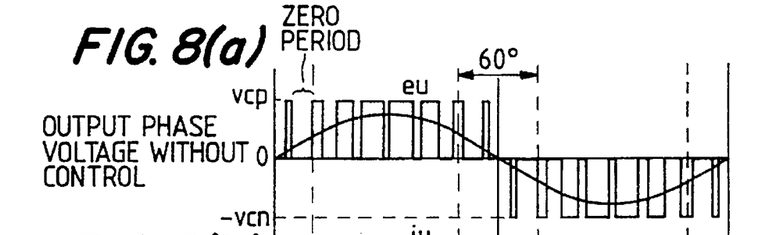
FIG. 8 is a diagram showing an example of operation waveforms for compensation of imbalance of the voltage capacitor voltages in the second embodiment.
Figure 8B:
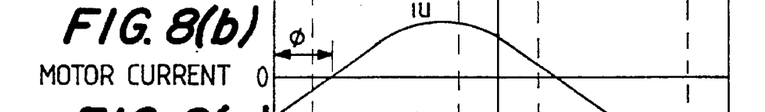
Figure 8C:
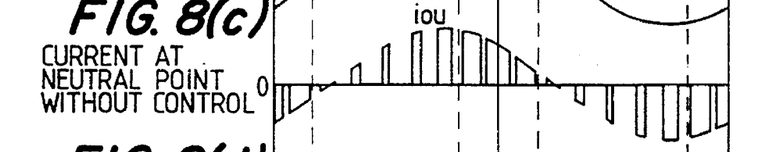
Figure 8D:
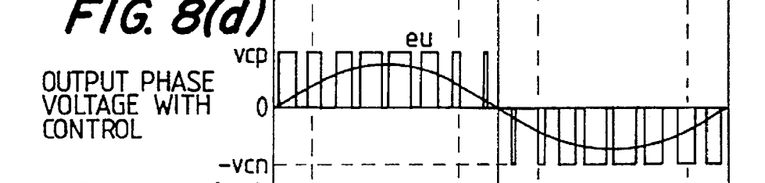
Figure 8E:
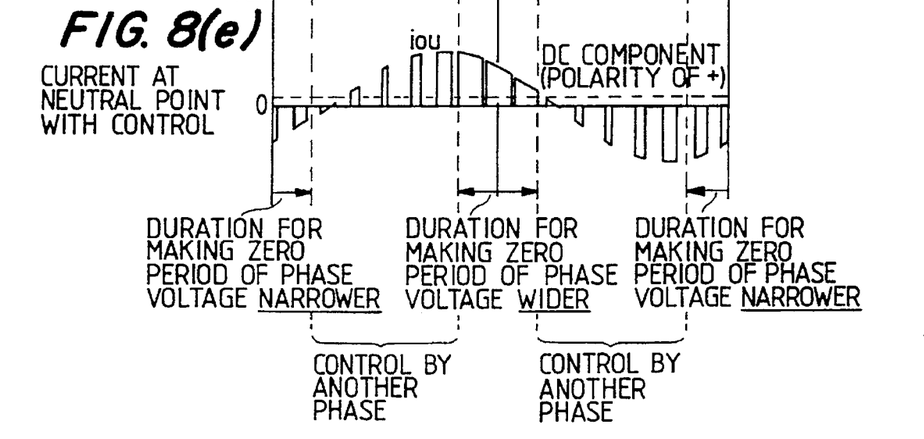

FIG. 7 depicts examples of waveforms of the voltage and current of a lagging power factor angle of 30°≦θ≦150° in a driving state, a zero power factor state, and a regeneration state. It can be seen that the current is always negative with the phase θ being in a range of −30°≦θ≦30° while the current is always positive with the phase θ being in a range of 150°≦θ≦210°. The average current is negative even with the power factor angle φ being in a range of 0°<φ<30° as long as the power factor is not 1.

This is same for a range of 150°<φ<180°. Such facts are into consideration in the second embodiment. Controlling the duration of the zero phase voltage period in the ranges alone enables it to omit the polarity detection of the current.

Of course, the second embodiment provides the same effect even if the control phase ranges are made narrower than the ranges of −30°≦θ≦30° and 150°≦θ≦210°. On the contrary, the same effect can be obtained if the control phase ranges are made wider, for example, −90°≦θ≦90° and 90°≦θ≦270°. For a leading power factor, on the other hand, the same operation is provided except that the current polarity is inverted.

FIG. 8 depicts an example of operation waveforms for compensation in the event of vcp<vcn for the phase U only. In FIG. 8, lines (a) to (c) show for operation without the neutral point voltage control when the motor current (in FIG. 8 at line (b)) coinciding with the output current is lagged by a power factor angle φ. The neutral point current iou of the phase U flows only when the output phase voltage eu shown in FIG. 8 at line (a) is zero. The waveform of the flowing neutral point current iou pulsates as shown in FIG. 8 at line (c).

As the neutral point voltage control is used, as seen in FIG. 8, at lines (d) and (e), the pulse duration of the output phase voltage is made wider to decrease the neutral point current with use of the fact that the motor current is always negative in the range of −30°≦θ≦30°. On the other hand, the pulse duration is made narrower to increase the neutral point current with use of the fact that the motor current is always positive in the range of 150°≦θ≦210°. The positive component is superimposed on the neutral point current. The other phases are controlled in the same way to control the output phase voltage over one cycle. The control can balance vcp with vcn. It should be noted that components other than the zero-phase component contained in the phase U neutral point current iou are canceled in the three phases so as not to affect the voltages of the voltage dividing capacitors.

The following describes construction of the second embodiment of the present invention by reference to FIG. 6.

In the figure there is shown a pulse duration modulating (PWM) means 1 which calculates output instances Tup and Tun of the output voltage pulse of the phase U, output instances Tvp and Tvn of the output voltage pulse of the phase V, and output instances Twp and Twn of the output voltage pulse of the phase W in terms of an output voltage command E* and an output frequency command Fi* every time To prior to the feeding out of the voltage pulse. The PWM means 1 feeds out an operation mode which is 1-bit information for determining whether the output voltage pulse is a rising instance or falling instance. The PWM means 1 also feeds out the phase θ of the output phase voltage. The phase θ is used in place of the current polarity signal in compensation of the pulse timing.

On the other hand, a difference voltage detecting means 3 is shown in the figure. The difference voltage detecting means three obtains the difference voltage Δvc (=vcp−vcn) of the voltages vcp and vcn of the voltage dividing capacitors with use of a subtracter 30 before detecting a low-frequency component ΔVc through a low-pass filter 31 and multiplying it by a desired gain G through a gain control 32 to create a basic compensation duration ΔT.

$$\Delta T = G \cdot \Delta V c \quad (4)$$

In the figure is also shown control phase selector means 47 to 49. Each of the control phase selector means 47 to 49 sets a control polarity and a control phase range depending on the phase θ (in reference to the phase U) of the output phase voltage, thereby omitting the polarity detection of the output current. Outputs of the control phase selector means 47 to 49 then are multiplied by the basic compensation duration ΔT to create pulse timing compensation durations ΔTu, ΔTv, and ΔTw for the phases.

That is, the following equations are obtained.

$$\Delta Tu = \Delta T (-30° \leq \theta \leq 30°) \text{ or} = -\Delta T (150° \leq \theta \leq 210°) \text{ or} = 0 \text{ (phase other than above)}$$

$$\Delta Tv = \Delta T (90° \leq \theta \leq 150°) \text{ or} = -\Delta T (270° \leq \theta \leq 330°) \text{ or} = 0 \text{ (phase other than above)}$$

$$\Delta Tw = \Delta T (210° \leq \theta \leq 270°) \text{ or} = -\Delta T (30° \leq \theta \leq 90°) \text{ or} = 0 \text{ (phase other than above)} \quad (5)$$

In the figure there is further shown a pulse timing compensating means 40 which compensates output instances of the output voltage pulses in terms of pulse timing compensation durations αTu, αTv, and αTw, output instances Tup, Tvp, and Twp of the output voltage pulses and operation mode information. The compensation is made with Eqs. 2 and 3, as shown in FIGS. 4(a), 4(b) and 5(a), 5(b), before the voltage pulses are fed out to a pulse output means 2.

The pulse output means 2 finally generates gate pulses depending on the output instances Tup' to Twn' to which the output phase voltage pulses are compensated before feeding them to the switching devices of the main circuit.

The second embodiment has a selection period of 120° per phase for the control phase. It may be made wider or narrower.

Further, the second embodiment has the neutral point voltage control for both periods including 0° (360 ) and 180°. The control can be provided for any one of the periods, but it is not desirable as the amount of one compensation is greater.

If the compensation gain is too high, the fundamental wave is distorted. If it is too low, on the other hand, control is not allowed for sudden occurrence of imbalance or increasing imbalance. The gain therefore has to be carefully selected.

The second embodiment, like the first embodiment, can be used not only for dipolar modulation and unipolar modulation, but also for a single pulse.

The three-level inverter, as described previously, can be used for controlling the inverter output voltage with use of a single pulse as described, for example, in the "Study of 2 and three-level Precalculated Modulation, EPE '91 Conference Record, p3, lines 228–233". The control can be accomplished by adjusting the duration of the single pulse. In the control, the output voltage waveform becomes symmetrical with respect to phases of 90° and 270°.

On the other hand, the second embodiment operates as follows. If vcp>vcn, the zero-voltage duration around 0° should be made wider and the zero-voltage duration around 180° should be made narrower. This can balance the voltage dividing capacitor voltages. If vcp<vcn, the operation is reversed. In this case, the output voltage waveform is made asymmetrical with respect to phases of 90° and 270°. But, it is temporal in the course of control, causing no problems. It should be noted that if the second embodiment is used for a single pulse, a certain zero-voltage period has to be kept for either of 0° or 180° or both.

The second embodiment can be accomplished in a simple construction as no current detection is needed. This provides the advantage that it is hard to undergo accuracy of a detector and noises. The embodiment also has the advantage that the time of software control can be made shorter.

The embodiments described above use an induction motor as an example of the load, but not limited by this example and can employ other loads for similar effects. The inverter described above can be alternatively operated as a self-exciting converter for converting the AC power to DC power in the way that its output terminals are connected with an AC power line through a reactor. The converter can be expected to provide the same effects as the inverter.

The embodiments described above have the operation timing of the output pulse period. They also can be used for pulse duration modulation by comparing a modulating wave and a carrier, for example, a sine wave and a triangular wave.

In the first embodiment shown in FIG. 1, this is accomplished by superimposing the amount of compensation on the modulated wave corresponding to the polarity of the product of the difference voltage polarity and the current polarity. In the second embodiment shown in FIG. 6, it is accomplished by superimposing the amount of compensation on only the period of the voltage phase mentioned above.

The present invention can supply a stable AC voltage by equalizing the voltage sharing of the DC-side voltage dividing capacitors of the three-level power converter independent of the PWM control method and the phase of the AC-side current. The present invention can prevent occurrence of an overvoltage from the main circuit devices of the converter.

We claim:

1. A power converting apparatus comprising:
    a plurality of capacitors connected in series across a DC voltage source, converter for converting DC voltages supplied from the capacitors to an AC phase voltage having three potentials, including a positive, zero, and negative potential, and
    zero-voltage adjuster for adjusting a zero-voltage duration of the AC phase voltage on a basis of an output current polarity of the power converting apparatus and a value representing a voltage difference between the voltages of the capacitors connected in series so as to balance the voltages.

2. The power converting apparatus according to claim 1, further including means for detecting the output current polarity of the power converting apparatus by detecting a direction of an AC-side current of the power converting apparatus.

3. The power converting apparatus according to claim 1, wherein the zero-voltage adjuster comprises means for adjusting the zero-voltage duration in such a way that, the zero-voltage duration is decreased when a product of said output current polarity and the voltage difference (Vcp-Vcn) is positive, and the zero-voltage duration is increased when a product of said output current polarity and the voltage difference (Vcp-Vcn) is negative.

4. The power converting apparatus according to claim 1, further including detector for detecting the output current polarity of the power converting apparatus by detecting whether a phase of a basic wave of the output phase voltage is within a predetermined phase duration around a zero point.

5. The power converting apparatus according to claim 1, wherein the zero-voltage adjuster operates in a multi-pulse mode that represents a half cycle of a basic wave of the output phase voltage in a train of a plurality of pulses.

6. The power converting apparatus according to claim 1, wherein the zero-voltage adjuster operates in a single-pulse mode that represents a half cycle of a basic wave of the output phase voltage in a single pulse.

7. The power converting apparatus according to claim 1, wherein
    the zero-voltage adjuster comprises an adjuster for adjusting the zero-voltage duration in such a way that, the zero-voltage duration on a duration including phase 0° of a basic wave of the output phase voltage is increased and the zero-voltage duration on a duration including phase 180° of a basic wave of the output phase voltage is decreased when a product of said output current polarity and the voltage difference (Vcp-Vcn) is positive, and the zero-voltage duration on the duration including phase 0° is decreased and the zero-voltage duration on the duration including phase 180° is increased when a product of said output current polarity and the voltage difference (Vcp-Vcn) is negative.

8. A power converting apparatus comprising:
    a plurality of capacitors connected in series across a DC voltage source,
    converter for converting DC voltages supplied from the capacitors to an AC phase voltage having three potentials, including a positive, zero, and negative potential,
    at least one current polarity detector disposed between said converter for converting and a load, for detecting an output current polarity of a current flowing between said means for converting and said load, and
    zero-voltage adjuster for adjusting a zero-voltage duration of the AC phase voltage on a basis of said output current polarity of the power converting apparatus and a value representing a voltage difference between the voltages of the capacitors connected in series so as to balance the voltages.

9. A power converting apparatus comprising:
    a plurality of capacitors connected in series across a DC voltage source,
    converter for converting DC voltages supplied from the capacitors to at least two AC phase voltages having three potentials, including a positive, zero, and negative potential, and outputting each AC phase voltage of said at least two AC phase voltages on a separate output line,
    a current polarity detector disposed on each output line between said converter for converting and a load, for detecting output current polarities of phase currents flowing between said converter for converting and said load, and
    zero-voltage converter for adjusting a zero-voltage duration of the AC phase voltage on a basis of said output current polarities of the power converting apparatus and a value representing a voltage difference between the voltages of the capacitors connected in series so as to balance the voltages.

10. A power converting apparatus comprising:
    a plurality of capacitors connected in series across a DC voltage source,
    converter for converting DC voltages supplied from the capacitors to three AC phase voltages having three potentials, including a positive, zero, and negative potential, and outputting each AC phase voltage of said three AC phase voltages on a separate output line,
    a current polarity detector disposed on each output line between said converter for converting and a load, for detecting output current polarities of three phase currents flowing between said converter for converting and said load, and zero-voltage adjuster for adjusting a zero-voltage duration of the AC phase voltage on a basis of said output current polarities of the power converting apparatus and a value representing a voltage difference between the voltages of the capacitors connected in series so as to balance the voltages.

* * * * *